June 1, 1926.
T. P. D. MARSHALL
1,587,486
SPONGE RUBBER ARTICLES, METHOD OF PRODUCING THE SAME AND COMPOSITION THEREFOR
Filed May 28, 1925
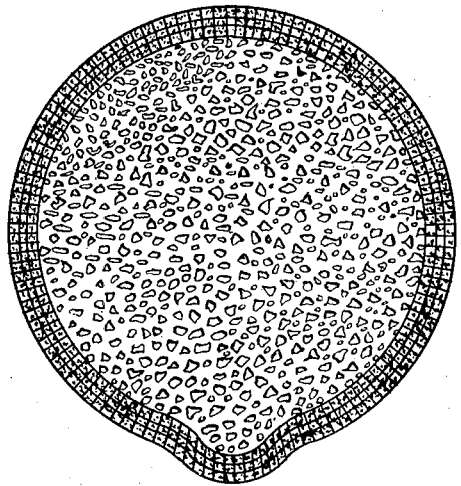
Inventor
T. P. D. Marshall
by
atty.

Patented June 1, 1926.

1,587,486

UNITED STATES PATENT OFFICE.

THOMAS PERCY DOUGLAS MARSHALL, OF WINGHAM, ONTARIO, CANADA, ASSIGNOR OF ONE-HALF TO JOSHUA HIRST, OF WINGHAM, CANADA.

SPONGE-RUBBER ARTICLES, METHOD OF PRODUCING THE SAME, AND COMPOSITION THEREFOR.

Application filed May 28, 1925. Serial No. 33,578.

The invention relates to improvements in the method of producing sponge rubber tubes as described in the present specification.

One object of the invention is to produce a composition of matter possessing the resilient characteristics of pneumatic devices without the various objectionable features thereof, thus rendering it more desirable for many purposes, such as the manufacture of inner tubes for vehicle tires, kneeling pads, seat cushions and other articles of a similar nature.

Pneumatic tubes for vehicle tires have always been most unsatisfactory owing to the ease with which they can be punctured and it is only for the want of a non-puncturable substitute having like resilient qualities that they have come into such great use and it is an object of the present invention to entirely replace these pneumatic tubes.

Another object is to produce an inner tube for vehicle tires which will not only retain its original shape throughout its life but will also serve to preserve the contour of the casing.

A further object is to provide an inner tube which will not crack and which will have a smooth exterior.

A still further object is to provide a composition of matter which is even in the pores and of great tensile strength.

And generally the objects of the invention are to provide a new material combining the requirements of resiliency, great tensile strength, lightness and durability and which may be manufactured at a low cost.

The invention consists in the improved composition of matter and in the novel method of producing same, as described and claimed hereinafter.

The drawing is a cross sectional view through an inner tube for a vehicle tire.

The ingredients which are employed in the production of this new composition of matter are as follows: crude rubber, stearic acid, sulphur, litharge, oxide of zinc, and petroleum product, and the proportions of each to the whole may be varied according to the various requirements of different articles being manufactured, but it has been found that best results have been obtained in the manufacture of inner tubes for vehicle tires by using these ingredients substantially in the following proportions: rubber, 70 parts; stearic acid, 2½ parts; sulphur, 10 parts; litharge, 2½ parts; oxide of zinc, 10 parts; and petroleum product, 5 parts.

In carrying out this process in the manufacture of inner tubes the rubber is first worked on rolling mills until it attains a plastic condition after which the other ingredients are added in substantially the proportions set out above and the whole is then thoroughly mixed together between rollers having a suitable speed variation (preferably of about 2½ to 1 revolutions). This resultant material is then rolled into sheets which are then placed in stoves, or other suitable heating apparatus, and subjected to heat at a sufficient temperature to bring the material to a porous state. Best results have been obtained by providing a heating temperature of about 100 degrees F. at which temperature it usually requires about 3 hours to bring the material to a proper porous condition, but the degree of heat may be varied somewhat with good results, in which case it will probably be necessary to also vary the length of time during which the material is subjected to the heat. The porous composition thus obtained is then put on rolls and worked at a lower temperature than that to which it was subjected to bring it to its porous state, the degree of heat being gradually increased during the working until it attains a temperature only slightly less than that required to bring it to its porous state. This comparative chilling on the rolls during working tends to increase the tensile strength and produces a composition which is even in the pores. Best results have been obtained when the working is commenced in a temperature of about 30 to 40 degrees F. and this temperature is gradually increased to about 70 to 90 degrees F. The material is then tubed by any desired process to the required diameter and placed in moulds and allowed to stand until the gases form pores in the material which causes it to expand to the required shape. It is then vulcanized in the ordinary way by subjecting it to steam heat.

The inner tubes produced by the above method will be found to have a honeycomb-like interior surrounded by a comparatively dense outer layer presenting a smooth exterior.

What I claim is:—

1. A method of producing sponge rubber tubes consisting in working a quantity of crude rubber to a plastic state and mixing thoroughly therewith stearic acid, sulphur, litharge, oxide of zinc and a petroleum product, rolling the resultant plastic material into sheets and subjecting same to heat until it attains a porous condition, then working on rolls at a temperature lower than that required to bring it to said porous condition, gradually increasing said temperature during working, tubing said material to the required diameter, then placing same in moulds until the pores caused by the gases have expanded the material to the desired shape, and then vulcanizing.

2. As an article of manufacture, an inner tube comprising a substantially honeycomb-like interior having a comparatively dense enclosing wall, said tube consisting of a mixture of crude rubber, stearic acid, sulphur, litharge, oxide of zinc, and a petroleum product.

3. A process of producing inner tubes consisting of working a quantity of crude rubber to a plastic state, mixing therewith sulphur, stearic acid, litharge, oxide of zinc and an oleaginous matter, then bringing same to a porous state by heating, working the resultant material under varying temperature, tubing said material, placing same in moulds to permit expansion, and vulcanizing.

4. As an article of manufacture, an inner tube for a vehicle tire, consisting of approximately 70 parts of crude rubber, 2½ parts of stearic acid, 10 parts of sulphur, 2½ parts of litharge, 10 parts of oxide of zinc and 5 parts of a petroleum product, all of said ingredients being thoroughly mixed to form a plastic mass, rolling said mass into sheets and subjecting the same to heat until porous, working same on rolls in a gradually increasing heat, tubing said material to the required diameter, then placing same in moulds to permit of expansion to the required shape, and vulcanizing.

5. A resilient composition of matter composed of crude rubber, stearic acid, sulphur, litharge, oxide of zinc, and a petroleum product, mixed in varying proportions according to the use for which it is required.

Signed at Toronto, Ont., this 11th day of May, 1925.

THOMAS PERCY DOUGLAS MARSHALL.